United States Patent Office 3,330,320
Patented July 11, 1967

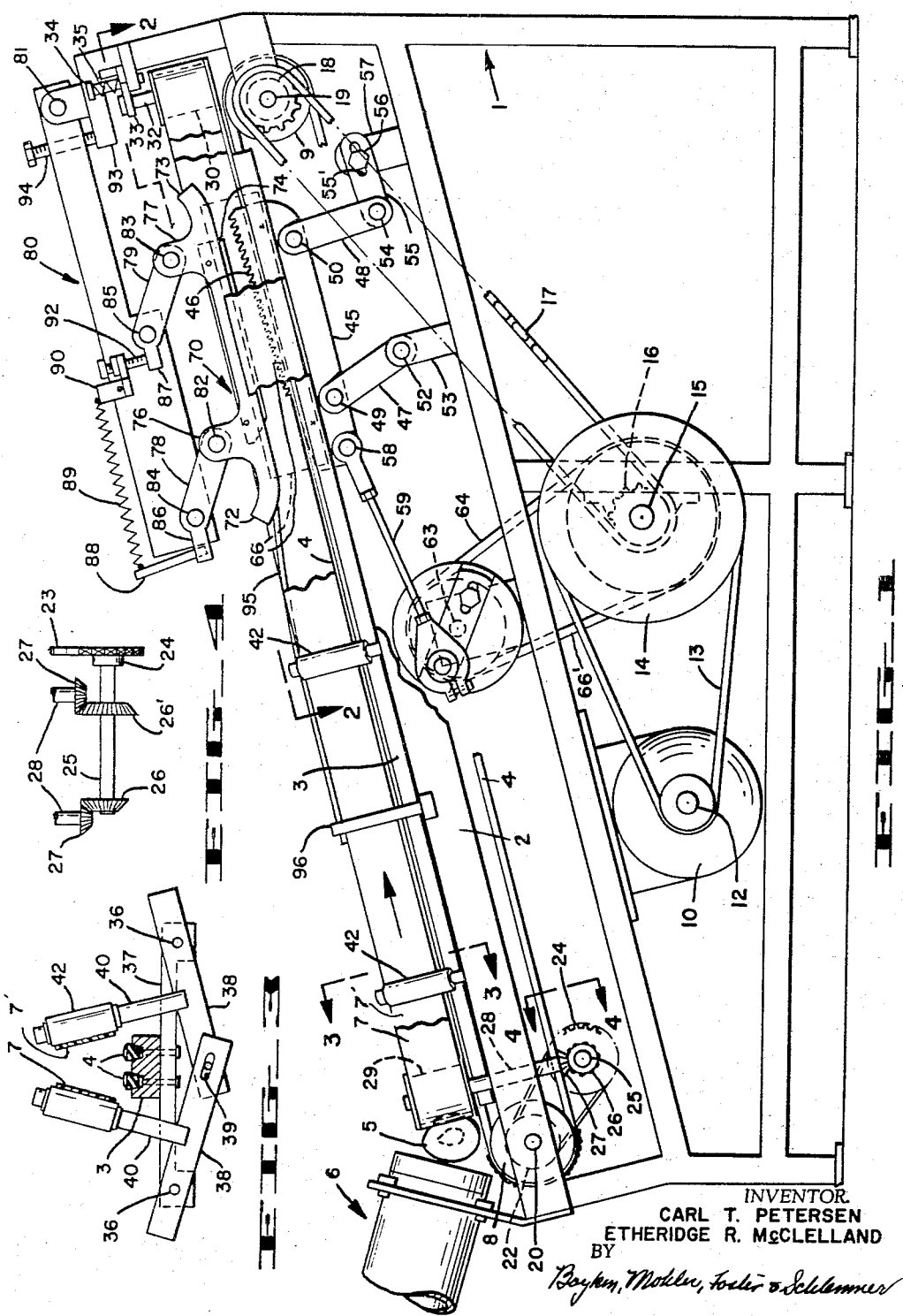

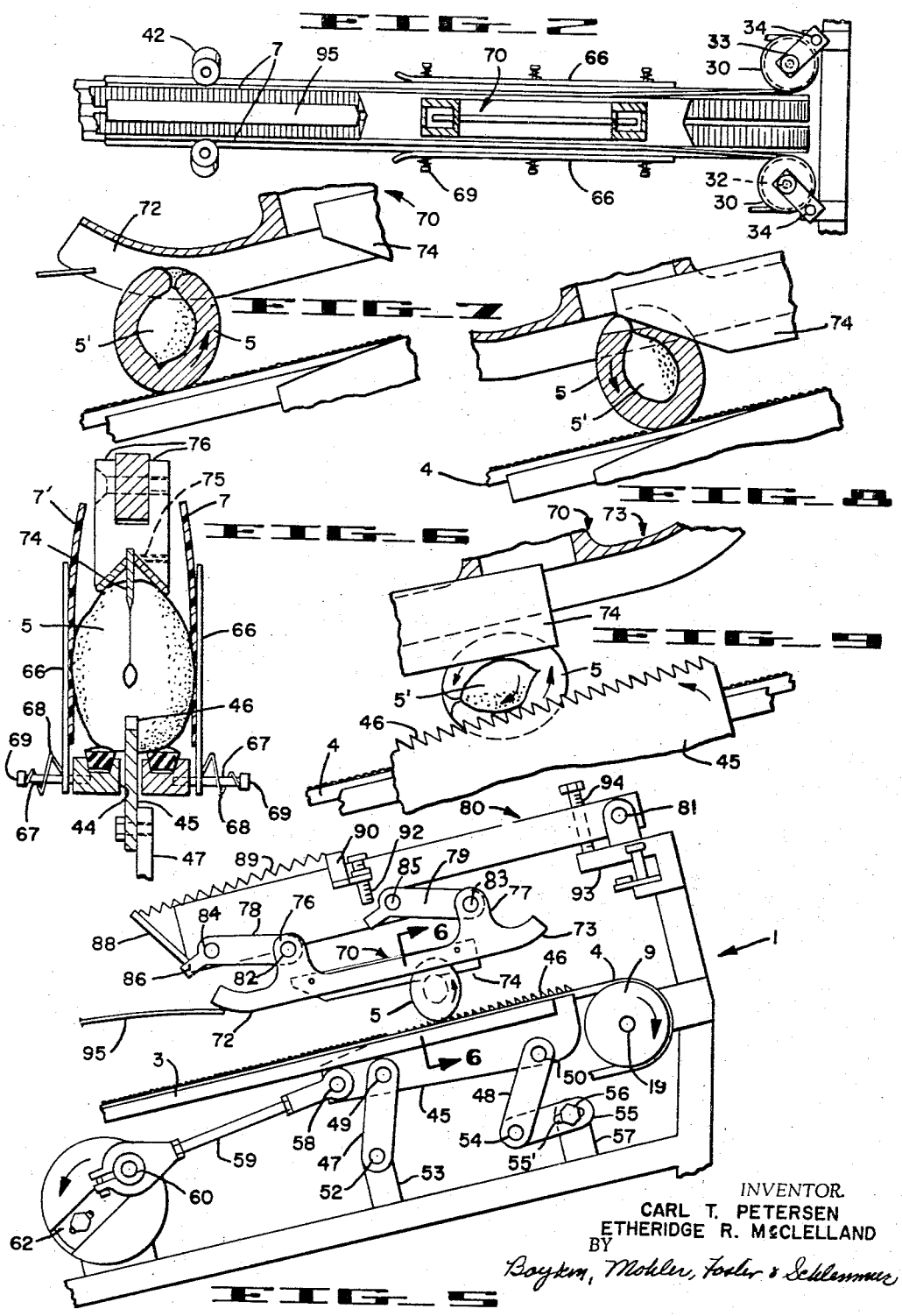

3,330,320
METHOD OF BISECTING AND PITTING FREESTONE DRUPES
Carl T. Petersen, Lafayette, and Etheridge R. McClelland, Hayward, Calif., assignors to Filper Corporation, San Ramon, Calif., a corporation of California
Original application Jan. 6, 1965, Ser. No. 423,788, now Patent No. 3,273,692, dated Sept. 20, 1966. Divided and this application Nov. 26, 1965, Ser. No. 509,748
5 Claims. (Cl. 146—224)

This application is a division of copending United States application Serial No. 423,788 filed January 6, 1965, now Patent Number 3,273,692, and a continuation-in-part of copending United States application Serial No. 307,898 filed September 10, 1963, now Patent Number 3,241,586, and has for one of its objects the provision of an improved method of bisecting and pitting freestone drupes, such as apricots.

Another object of the invention is the provision of improved method for conveying fruit bodies, such as apricots, to and past a pitting station in a line free from any tendency of the fruit bodies to jam against each other during the movement of said bodies to and at said pitting station so that said bodies will be more efficiently conducted to said station, and pitted.

Heretofore in a pitting machine of generally the character of the machine shown and described in this application, where the apricots are rapidly rolled in single file to and past the bisecting and pitting mechanism it is highly desirable that the apricots should not jam against each other. Preferably, they should be spaced slightly apart or at least the leading apricot of each adjacent pair in the row should not be pressed by the trailing apricot.

The apricots from a bulk source are preferably fed to the orienting and transfer means and pitter of the present invention by a feeder substantially as shown in United States Letters Patent No. 3,199,652 issued August 10, 1965 to George E. Kilner and Leonard McGihon. This feeder delivers the apricots in a single file to the present transfer means, but they are not oriented, and they are relatively close together, which is desirable from the standpoint of volume.

In the present invention, as in the aforesaid Patent Number 3,241,586, the orienting and transfer of the apricots involves a positive rotation of the apricots, as they are carried along the path of travel to and past the bisecting and pitting means, in a direction opposite to the normal direction of rotation of a free rolling apricot. Heretofore, adjacent apricots in the row would frequently engage each other resulting in undesirable jamming or pressure and loss of efficiency in the orienting of the apricots as well as in the bisecting and pitting.

The present method substantially overcomes the foregoing objections without loss in volume.

Other objects and advantages will appear in the description and drawings.

In the drawings, FIG. 1 is a side-elevational view of the machine, partly broken away, illustrating the apparatus adapted to carry out the method.

FIG. 2 is a fragmentary cross-sectional view taken along line 2—2 of FIG. 1.

FIG. 3 is an enlarged, cross-sectional view taken along line 3—3 of FIG. 1.

FIG. 4 is a fragmentary elevational view of part of the machine substantially as seen from line 4—4 of FIG. 1.

FIG. 5 is an enlarged, fragmentary, side-elevational view of the pitting mechanism that is adjacent to the right-hand end of FIG. 1 illustrating the mechanism with a drupe positioned therein.

FIG. 6 is a fragmentary, enlarged cross-sectional view taken substantially along line 6—6 of FIG. 5.

FIG. 7 is a fragmentary, enlarged, cross-sectional view showing an apricot in a position at the commencement of the bisecting operation.

FIG. 8 is a view similar to that of FIG. 7 but showing the apricot farther advanced than in FIG. 7.

FIG. 9 is a view similar to FIGS. 7, 8, with the apricot in the pitting operation farther advanced to a position generally corresponding to that of FIG. 5.

The machine illustrated in the drawings comprises a frame 1 having parallel horizontally elongated side frame members 2, and extending between said side frame members are end and cross frame members, all being a part of frame 1, which frame carries a stationary, horizontally elongated belt support 3 (FIG. 3). Support 3 is formed with a pair of horizontally spaced, parallel, upwardly opening grooves extending longitudinally of the support. The upper runs of a horizontally extending pair of endless V-belts 4 are slidably supported in said grooves with the apices of the belts disposed in said grooves, and with the base surfaces opposite to said apices being formed with a relatively soft roughened, horizontally disposed surface, such as produced by ridges or the like for carrying drupes 5 from left to right as seen in FIG. 1, and to insure rotation of said drupes as they are so carried.

The drupes may be referred to hereinafter as apricots, inasmuch as the machine is primarily used for bisecting and pitting apricots, although it is to be understood that the use of the invention is not necessarily limited to apricots. Also, hereinafter the use of the word "frame" refers to any rigid part of the frame, including the side frame members 2, where applicable.

The apricots 5 (FIG. 1) are fed onto the feed end of belts 4, which is the left-hand end of the machine as viewed in FIG. 1, by any suitable single-line feeding means, such as is generally designated 6, and as more fully shown and described in said United States Patent No. 3,199,652, although this invention is not limited thereto. At said feed end of said machine, the apricots pass between the adjacent horizontally extending, horizontally spaced opposed runs of a pair of endless belts 7, 7' that are parallel with belts 4. The belts 7, 7' are generally vertical transversely of their lengths, and extend upwardly from approximately the upper level of the belts 4 (FIG. 6).

Belts 4 respectively extend over a pulley 8 at the feed end of the machine and over a pulley 9 at the discharge end, the latter being at the right-hand end of the machine of FIG. 1. The said belts 4 and belts 7, 7' are driven by a motor 10 so that the upper runs of said belts and the adjacent runs of belts 7, 7' will move in the same direction from left to right as seen in FIG. 1 with the belts 7, 7' being normally moved at a slower rate of speed than the belts 4, so that the apricots supported on belts 4 will rotate counterclockwise about their respective horizontal axes as they are carried by belts 4 from the feed to the discharge end of the machine (FIG. 6).

Motor pulley 12 is connected by a belt 13 with a pulley 14 that, in turn, is secured on a shaft 15 (FIG. 1). Shaft 15 is journalled for rotation in bearings carried by frame 1, and said shaft has a sprocket wheel 16 secured thereto, which sprocket wheel is connected by a chain 17 with a sprocket wheel 18. The sprocket wheel 18 is secured on a shaft 19 that is at the discharge end of the machine, and shaft 19 is journalled for rotation in bearings carried by the frame 1. Pulley 9 is also secured on shaft 19.

Pulley 8, which is at the feed end of the machine, is secured on a shaft 20, which shaft is journalled for rotation in bearings on frame 1. A sprocket wheel 22 is also secured on shaft 20. This wheel is connected by a sprocket chain 23 with a sprocket wheel 24, the latter being secured on a shaft 25 that, in turn, is rotatable in bearings on frame 1. Shaft 25 has a pair of opposed bevel gears 26, 25' secured thereto, which gears have their teeth in mesh with the teeth of a corresponding pair of bevel gears 27, respectively secured on the lower ends of a pair of vertically extending pulley shafts 28, the later being rotatably supported in bearings carried by frame 1. Pulleys 29 are secured on the upper ends of shafts 28 at the feed end of the machine, and belts 7 extend around said pulleys, while belts 4 extend over pulley 8.

It is to be noted (FIG. 4) that gear 26' is larger in diameter than gear 26; hence, the belt 7' will move faster than belt 7. This arrangement insures the orienting of the apricots between belts 7, 7' before the apricots reach the bisecting and pitting mechanism, so that the minor axes of the apricots that are normal to a vertical plane bisecting the bodies of the fruit will be horizontal and normal to the path of travel of the apricots between belts 7, 7'. Thus, the apricots will be bisected to their pits in the plane of their sutures. Were belts 7, 7' to move at the same speed, there are instances in which the apricots will be carried between and by belts 7, 7' to the bisecting and pitting mechanism with their sutures in a plane normal to said path of travel. In the present arrangement, such apricots are turned, and when their slightly flattened sides are against belts 7, 7' the major axis of each apricot is in a vertical plane and the apricots will engage the belts 4 and will be rotated about their minor axes, and approximately about the points of engagement between the apricots and the generally opposedly facing surfaces of belts 7, 7' and they will remain with their sutures in a vertical plane substantially bisecting the space between said belts.

Pulleys 30 at the discharge end of the machine (FIG. 2) support the belts 7, 7' at their ends opposite to the feed end, which pulleys 30 are rotatable on vertically disposed shafts 32, the latter depending from one of the ends of horizontally disposed arms 33. The opposite ends of arms 33 are pivotally supported by pivots 34, and a torsion spring 35 about each pivot (FIG. 1) is secured at one end to each arm for yieldably swinging the ends carrying the pulley shafts 32 in a direction away from pulleys 29 to maintain belts 7 relatively taut (FIGS. 1, 2). Pivots 34 are supported on frame 1.

Pivots 36 (FIG. 3) are carried by cross members 37 that, in turn, are rigid on frame 1 and these pivots swingably support one of the ends of a pair of equalizer links 38, which links, in turn, are connected at one of their ends by a pin-slot connection 39, so that the links will swing simultaneously and to equal degrees relative to spaced pivots 36 when either of the arms is swung. Pivots 36 are outwardly of opposite sides of the pairs of belts 4, and the pin-slot connection between the adjacent ends of each pair of arms is centrally below the pair of belts 4. Generally vertically extending shafts 40 rotatably support rollers 42 at their upper ends, which rollers engage the opposite outer sides of the adjacent runs of belts 7, 7' and the positions of these rollers are such that they will cause the said runs of belts 7, 7' to extend convergently upwardly, transversely of their lengths, so as to yieldably engage the apricots 5 at opposite sides thereof at points above their horizontal axes.

The rollers 42 are preferably positioned to effect the above-described transverse inclination of the belts from a point adjacent to the feed end of the machine to a point adjacent to the bisecting and pitting mechanism, and by this arrangement, the apricots will not only be held downwardly on belts 4 but, together with the relative movement between belts 7, 7' longitudinally thereof, will be oriented so their sutures will be vertical and in a plane parallel with the belts 4 and substantially midway between said belts. It is pertinent to note that pulleys 29 are spaced apart a sufficient distance to enable the largest size fruit to pass between them, and rollers 42 urge the belts closer together to insure the desired engagement between the belts and the fruit. Thus, the belts 7, 7' extend convergently from pulleys 29 to the adjacent pulleys 42, and then substantially parallel to substantially the discharge end of the machine.

*Bisecting and pitting mechanism (lower part)*

The bisecting and pitting mechanism is supported on a frame and is positioned between the pairs of pulleys 8, 9, but it is adjacent to pulley 9. While pulley 8 and pulley 9 have been referred to as singular, they may obviously be in pairs, inasmuch as they rotate together on shafts 20, 19. The bisecting and pitting mechanism is in two parts; an upper part that is above the belts 4 and a lower part that is below and that extends upwardly between belts 4. Also, the lower part includes elements that extend upwardly at opposite outer sides of the pair of belts 4 and 7, 7' as will later be described more in detail.

The belt support 3 is divided, longitudinally thereof at the pitting and bisecting mechanism, to provide a longitudinally extending slot 44 (FIG. 6) through which a vertically disposed, horizontally elongated blade 45 extends from below the belts 4, upwardly between them to a level above the latter, when the blade is at a point in the movement, which blade extends longitudinally of said slot.

Blade 45 is formed along its upper edge with square, unset saw teeth 46, the sharp upper edges of which are preferably directed generally against the direction of travel of the body of each apricot 5 (FIG. 9) and to the direction of rotation of the pit 5' in each apricot. The thickness of blade 45 is exaggerated in FIG. 5, as is the thickness of belts 7, 7', the latter being preferably of plastic and relatively thin.

Blade 45 is supported vertically on the upper ends of a pair of links 47, 48 (FIG. 5). These links are not parallel, and the upper end of link 47, which is nearest the feed end of the machine, is connected with blade 45 by a horizontal pivot 49 while the upper end of link 48 is connected with said blade by a pivot 50. Pivots 49, 50 are relatively widely spaced apart longitudinally of the blade and are respectively adjacent to opposite ends of the blade. The lower end of link 47 is connected by a horizontal pivot 52 with a bracket 53 rigid on frame 1, while the lower end of link 48 is connected by pivot 54 with one end of an adjustable arm 55 that is adjustably secured by a bolt 56 to a bracket 57 that is rigid on the frame of the machine. Arm 55 extends from bolt 56 toward the link 47 that is at the end of the blade nearest the feed end of the machine, and the angle of arm 55 as well as the distance it projects from bracket 57 may be adjusted, since bolt 56 extends through a slot 55' in arm 55, said slot extending longitudinally of arm 55.

The end of blade 45 that is nearest to the feed end of the machine is connected by a pivot 58 with one end of a connecting rod 59, and the other end of said rod is connected with a crank pin 60 of an adjustable crank arm 62 that, in turn, is secured to the other end of a shaft 63 (FIG. 1). Shaft 63 carries a pulley that is connected by a belt 64 with a pulley on shaft 15.

The upper edge of the end of the blade 45 that is adjacent to the feed end of the machine is preferably below the upper level of belts 4, while the row of teeth may project above the upper level of the belts, as will be explained.

In operation, referring to FIG. 5, the blade 45 is shown at the extreme end of its stroke in the direction toward the discharge end of the machine. The row of teeth may be substantially horizontal. Also, due to the arrangement of links 46, 48, when the connecting rod 59 is in the position shown in FIG. 5, the row of teeth 45 may be almost parallel with and adjacent to the upper level of the belts 4. The link 47 is slightly inclined relative to the upper runs of belts 4 from pivot 52 toward the discharge end of the machine and link 48 has a similar but substantially greater inclination in the same direction. As a result, when the crank 62 is revolved in the direction of the arrow (FIG. 5) the blade will be moved toward the feed end of the machine and opposite to the direction of movement of the apricots, and at the same time the blade 45 will move upwardly and will rock so that the end of the row of teeth adjacent to the discharge end of the machine will be substantially higher than the end of the blade that is nearest to the feed end of the machine (FIG. 1). The row of teeth will have a raking action and will positively engage the pit that is in the drupe and will cause a relative movement between the pit and the flesh by rotating the pit in a direction opposite to the direction of rotation of the flesh. This reciprocatory and rocking movement of blade 45 is preferably quite rapid relative to the movement of the conveyor belt 4, and, as already stated, the degree of elevation of the teeth 46 is such as to positively engage a pit in any apricot that is held against the belts 4 and that is moved along the blade.

The lower part of the bisecting and pitting mechanism also includes a pair of horizontally extending, vertically disposed side plates 66 (FIGS. 1, 2, 6) that slidably engage the oppositely outwardly facing surfaces of the adjacent runs of belts 7, 7' where the latter are at opposite sides of apricots 5. These plates are slidably supported along their lower edges on pins 67, and springs 68 react between heads 69 on said pins and the plates 66 to yieldably hold the plates against said belts and to yieldably hold the belts against the apricots. The latter have been oriented by the time they reach the bisecting and pitting mechanism, so that the sutures of the pits are in a vertical plane extending longitudinally of the machine and substantially midway between plates 66 and belts 7, 7'.

Upper part of bisecting and pitting assembly

The upper part of the bisecting and pitting assembly comprises, for the most part, a generally horizontally extending, elongated hold-down member 70 that is of inverted V-shape in cross-sectional contour, formed with upturned curved opposite end portions 72, 73 (FIGS. 1, 5). Member 70 is formed with a longitudinally extending central slot along the apex of its inverted V-shaped contour within which is fitted a horizontally elongated cutting blade 74 (FIGS. 5, 6) that is rigidly secured to said member in any suitable manner, such as by pins 75. The straight intermediate portion of the member 70 preferably extends substantially the full length of the blade 74. The lower cutting edge of blade 74 projects downwardly a sufficient distance to cut the body of an apricot at its upper side to substantially the pit, and the straight lower edge of blade 74 slants slightly downwardly relative to member 70 in a direction toward the discharge end of the machine.

Two pairs of upstanding ears (FIG. 1) are integral with the hold-down member and project upwardly from its upper side, one pair 76 (FIG. 5) being adjacent to curved end 72, and the other pair 77 is adjacent to the opposite curved end 73, which end is nearest the discharge end of the machine. A pair of links 78, 79 swingably suspend the hold-down member 70 from a horizontally extending overhead support 80, one end of which support projects toward the discharge end of the machine where it is connected with the frame 1 by a horizontal pivot 81. One of the ends of the arm or link 78 is positioned between the pair of ears 76 and is connected with said ears by pivot 82 while the other link 79 is between and is pivotally connected with ears 77 by pivot 83.

Links or arms 78, 79 are parallel, extending generally toward the feed end of the machine, and upwardly from pivots 82, 83, and the upper end of said links are respectively connected with support 80 by pivots 84, 85.

The words "forward," "forwardly," "rear" and "rearwardly" as used herein refer to the discharge and feed ends of the machine. Since the apricots move forwardly in the machine from the rear end, the forward end of the machine is the discharge end, and the rear end is the feed end.

The links 78, 79 thus project rearwardly, and on the rear end of each link is a horizontally extending projection, the one on link 78 being designated 86, and the one on link 79 being designated 87.

An upstanding lug or post 88 rigid on projection 86 is connected at its upper end by a helical spring 89 with a projection 90 that is rigid with the overhead support 80.

A vertically extending screw 92 threadedly extending through part of the rigid projection 90 is adapted to engage projection 87 to limit the downward movement of the hold-down member 70 under the influence of spring 89. Spring 89 will yieldably resist upward movement of the hold-down member 70, but permits such movement.

The rigid frame 1 to which the forward end of support 80 is pivoted includes a lateral projection 93. A vertically extending screw 94 threadedly extends downwardly through the support 80 adjacent to pivot 82, and said screw is located between said pivot and the portion of the overhead support carrying the hold-down member. This screw 94 engages the projection 93 to limit the bodily downward movement of the hold-down member, while upward bodily movement of said member is permitted, should sufficient upward force be exerted against the underside of the hold-down member. Screw 94 permits variations in the distance between the hold-down member and the belts 4 when the hold-down member is in its lowermost position, while the screw 92 enables varying the tension on spring 89. Of course the screw 92 also enables varying the distance between the hold-down member and belts 4, but the tension of spring 89 will be varied at the same time.

At the rear side of the hold-down member is a horizontally elongated leaf spring 95 that is secured at its rear end to an overhead, rigid cross member 96. This spring terminates in a free forward end at a point adjacent to the rear end of the hold-down (FIG. 2) and it inclines downwardly in a forward direction to slidably and yieldably engage the upper sides of the apricots at about the point where such apricots pass between the forward ends of plates 66 where belts 7 are approximately vertical. The apricots will freely pass below the rear end of the spring.

Operation

An important feature of the present invention, both as to the apparatus and the method involved is the position of the machine. The frame 1 is arranged, as best seen in FIG. 1, in which the frame 1 supports the belts 4, 7, 7', at an upwardly extending incline in a direction from the feed end of the machine to the discharge end.

The degree of inclination of belts 4 and the rate of movement of said belts from the feeder 6 to the pitting mechanism 80 are such as to overcome the influence of gravity tending to roll the drupes down the incline, but nevertheless the drupes are always under said influence, and it causes the substantially instantaneous spacing between apricots when the trailing apricot of an adjacent pair bumps into the leading apricot. Smaller sized apricots move faster than the larger ones, and other surface irregularities can affect the rate of travel and consequent engagement between apricots.

Substantially higher efficiency in both orienting the apricots and in bisecting and pitting them is the result of the upward inclination of the belts 4, 7, 7', and the movement of one of the orienting belts 7, 7' faster than the other contributes the better orienting of the apricots and to the new and improved results from inclining the belts 4, 7, 7', as described.

The degree of inclination of the belts 4, 7, 7', relative to horizontal may vary, but is normally preferable at approximately five to thirty degrees.

In operation, the apricots are fed in single file and in substantially equally spaced relation onto the feed end of belts 4 which rapidly carries them to the right, as seen in FIG. 1, to the bisecting and pitting assembly. As the apricots are so carried on belts 4, they are rotated about their horizontal axes so that the lower sides of the apricots will move generally in the same direction as they are being carried, and their upper sides will move generally in the opposite direction. The engagement between the opposite sides of the apricots and belts 7 and the differential between the rate of movement of belts 7 and belts 4 effects positive orientation of the apricots so the sutures of their pits will be in a vertical plane parallel with intermediate belts 4.

Upon the apricots reaching the feed end of the bisecting and pitting assembly, they will be oriented, and the sharpened edge of the overhead blade 74 will bisect the body to the pit by the time the apricot reaches the row of teeth 46. The inverted V-shaped hold-down 70 will center the apricot as well as urge it downwardly against belts 4, while the parallel vertically disposed belts 7, in cooperation with side plates 66, will insure against inaccurate and wasteful cutting of the body of the apricot by blade 74.

The teeth 46 of blade 44 will enter the cut formed by the cutting edge of blade 74, and the rate of the generally reciprocatory and oscillatory movement of blade 44 relative to the rate at which the apricots is carried by belts 4 is such that the teeth 46 will positively engage the lower edge of the pit after the body has been bisected, to rotate the pit in a direction opposite to the direction of rotation of the body (FIG. 8). The pit may be engaged several times by the teeth 46 to effect this result before the body of the apricot leaves the pitting and bisecting assembly, thereby completely forcing the pit from the meat or body of the apricot.

FIGS. 6, 7 are illustrative of the progressive movement of the apricot as it enters the bisecting and pitting mechanism.

FIG. 8 shows the bisected body at the time teeth 46 engage the pit 5'.

After the halves and pits are completely separated from each other and leave the bisecting and pitting assembly they will be carried off the discharge end of the machine and the freed pits may readily be removed from the fruit halves, it being understood that the pits are completely free from the halves at this time.

The machine illustrated shows a machine for handling one file of apricots. It is obvious that a plurality of sets of belts and bisecting and pitting assemblies may be incorporated in a machine and operated simultaneously from a single source of power, which is the practice in many commercial installations.

While a preferred form of the invention is shown and described, it is to be understood that changes in details of construction can be made without departing from the invention within the scope of the appended claims, and in connection with such possible modification, the teeth 46 on blade 45 may be of inverted V-outline or slanted oppositely to the direction shown in FIG. 8. In either case, the recipocation of the blade is so rapid that positive relative rotation between the pit and the body of the fruit would be effected, whether such rotation of the pit were in the same direction as the rotation of the body or in the opposite direction.

It will be understood that various modifications may be made without departing from the spirit of our invention, and that therefore we do not intend to limit ourselves in any manner other than as pointed out in the following claims.

We claim:

1. The method of pitting a generally spherical, whole, freestone drupe having a suture and a major and a minor axis substantially at a right angle to each other with said major axis and said suture being substantially in the same plane, comprising the steps of:

(a) moving said drupe, including the pit therein in one direction in a generally horizontally extending, straight path of travel, and at the same time rotating said drupe about a horizontal axis so that its upper side, including the upper side of said pit, moves in an opposite direction to said one direction; and at the same time;

(b) rotating said drupe about a generally vertical axis until said suture is in a vertical plane parallel with said path;

(c) thereafter continuing said movement in said path and said rotation of said drupe and pit about said horizontal axis while maintaining said suture in said plane, and bisecting the body of said drupe in said plane to the pit therein, and at substantially the same time, positively engaging said pit within said plane and rotating said pit relative to said body in a direction opposite to said direction of rotation of said drupe to thereby completely separate said pit from the halves of the bisected drupe.

2. The method as defined in claim 1, in which the step of engaging said pit includes:

(d) inserting a pointed projection between the cut faces of the halves resulting from bisection of said body, and into nonslipping contact with said pit and then moving said projection while in said contact in a direction opposite to the direction of movement of said drupe in said path.

3. In the method as defined in claim 1:

(d) said rotation of said pit within said drupe relative to the body thereof, being at a rate of speed substantially faster than the rate of rotation of said body in said path.

4. The method as defined in claim 1 that includes the steps of:

(d) holding said drupe downwardly against a support during said movement thereof along said path, and the said engagement with said pit being with the underside of said pit adjacent to its leading end.

5. The method of pitting generally spherical drupes, of different sizes, such as apricots, each having a suture in one plane and a major and minor axis with the major axis disposed in said plane, and the minor axis at a right ngle thereto, comprising the steps of:

(a) rollably supporting said drupes in indiscriminate order as to size and positions of their sutures, in a single file in a straight row on a substantially straight supporting surface and at the same time holding said drupes in said row between and in frictional engagement with a pair of substantially straight surfaces extending longitudinally of and substantially parallel with said row for movement of said drupes in one direction in a path of travel extending longitudinally of said row;

(b) simultaneously moving said drupes of said row in said path by moving said supporting surface in said one direction;

(c) rotating the drupes of said row during their said movement in said path about horizontal axes and in a direction for movement of their lower sides in the same direction as said direction of movement of said supporting surface, and positioning the drupes with their sutures in a vertical plane, by moving said supporting surface faster than said pair of surfaces;

(d) bisecting said apricots in a vertical plane adjacent to one end of said path to the pit within each drupe, after their sutures are in said vertical plane, and at substantially the same time completely separating the pit within each drupe from the halves thereof while said drupes are being moved in said path and are between said pair of surfaces and are being rotated by movement of said supporting surface;

(e) successively positioning said drupes on said supporting surface and between said pair of surfaces in spaced relation at the end of said path opposite to said one end thereof for movement to said one end;

(f) automatically effecting a spacing between the drupes of adjacent pairs in said row in which the trailing drupe of each such pair is moved into engagement with the leading drupe due to faster movement of such trailing drupe, by positioning said supporting surface and said pair of surfaces at an incline relative to horizontal for movement of the drupes of said row up an incline, whereby the drupes will be spaced from each other during bisecting and pitting thereof.

References Cited

UNITED STATES PATENTS 3,194,290   7/1965   McClelland et al. ____ 146—238

WILLIAM W. DYER, JR., *Primary Examiner.*

W. GRAYDON ABERCROMBIE, *Examiner.*